United States Patent
Cao et al.

(10) Patent No.: US 12,156,213 B2
(45) Date of Patent: Nov. 26, 2024

(54) TRANSMISSION RESOURCE SWITCHING

(71) Applicant: ZTE Corporation, Guangdong (CN)

(72) Inventors: Wei Cao, Guangdong (CN); Nan Zhang, Guangdong (CN); He Huang, Guangdong (CN); Xiaojuan Shi, Guangdong (CN); Chengliang He, Guangdong (CN)

(73) Assignee: ZTE Corporation, Shenzhen (CN)

( * ) Notice: Subject to any disclaimer, the term of this patent is extended or adjusted under 35 U.S.C. 154(b) by 495 days.

(21) Appl. No.: 17/666,491

(22) Filed: Feb. 7, 2022

(65) Prior Publication Data
US 2022/0167338 A1    May 26, 2022

Related U.S. Application Data

(63) Continuation of application No. PCT/CN2019/099962, filed on Aug. 9, 2019.

(51) Int. Cl.
| | |
|---|---|
| H04W 72/04 | (2023.01) |
| H04W 36/00 | (2009.01) |
| H04W 72/20 | (2023.01) |
| H04W 36/24 | (2009.01) |
| H04W 36/32 | (2009.01) |

(52) U.S. Cl.
CPC ....... *H04W 72/20* (2023.01); *H04W 36/0055* (2013.01); *H04W 36/249* (2023.05); *H04W 36/322* (2023.05)

(58) Field of Classification Search
CPC ... H04W 28/04; H04W 72/04; H04W 72/042; H04W 88/08; H04W 72/20; H04W 72/0406; H04L 5/0007

USPC .......................................................... 370/329
See application file for complete search history.

(56) References Cited

U.S. PATENT DOCUMENTS

| | | | |
|---|---|---|---|
| 9,025,436 B2 | 5/2015 | Oizumi et al. | |
| 10,764,866 B2 | 9/2020 | Loehr et al. | |
| 11,177,920 B2 | 11/2021 | Wu et al. | |
| 11,617,176 B2 * | 3/2023 | Ang | H04W 72/23 370/329 |
| 11,632,768 B2 * | 4/2023 | Choi | H04W 72/0453 370/329 |

(Continued)

FOREIGN PATENT DOCUMENTS

| | | | | |
|---|---|---|---|---|
| CN | 107342949 A | * | 11/2017 | ............ H04L 47/52 |
| CN | 109479285 A | | 3/2019 | |

(Continued)

OTHER PUBLICATIONS

International Search Report and Written Opinion mailed on Apr. 24, 2020 for International Application No. PCT/CN2019/099962, filed on Aug. 9, 2019 (7 pages).

(Continued)

*Primary Examiner* — Peter G Solinsky
*Assistant Examiner* — Sanjay K Dewan
(74) *Attorney, Agent, or Firm* — Perkins Coie LLP

(57) ABSTRACT

Methods, systems, and devices for transmission resource switching are described. A wireless communication method is provided to comprise configuring, by a network device, a configuration message to facilitate a transmission resource switching among sets of resources; and communicating, by the network device, with a user device to perform the transmission resource switching.

20 Claims, 11 Drawing Sheets

1010
Configuring, by a network device, a configuration message to facilitate a transmission resource switching among sets of resources 1020
Communicating, by the network device, with a user device to perform the transmission resource switching.

(56) References Cited

U.S. PATENT DOCUMENTS

| | | | |
|---|---|---|---|
| 11,729,788 B2 * | 8/2023 | Choi | H04L 1/1664 |
| | | | 370/329 |
| 2017/0289767 A1 * | 10/2017 | Yu | H04W 4/40 |
| 2018/0020387 A1 | 1/2018 | Van Der Velde et al. | |
| 2019/0141695 A1 * | 5/2019 | Babaei | H04W 56/0045 |
| 2019/0393989 A1 * | 12/2019 | Jung | H04L 1/08 |
| 2021/0167930 A1 * | 6/2021 | Jeon | H04L 27/2607 |
| 2021/0377913 A1 | 12/2021 | Li | |
| 2023/0077735 A1 * | 3/2023 | Ji | H04L 5/0053 |
| | | | 370/329 |
| 2023/0084972 A1 * | 3/2023 | Choi | H04L 5/0053 |
| | | | 370/329 |
| 2023/0108413 A1 * | 4/2023 | You | H04B 7/15542 |
| | | | 370/329 |
| 2023/0144052 A1 * | 5/2023 | Islam | H04L 5/001 |
| | | | 370/329 |
| 2023/0254761 A1 * | 8/2023 | Noh | H04L 5/0051 |
| | | | 370/329 |

FOREIGN PATENT DOCUMENTS

| | | | |
|---|---|---|---|
| CN | 109479285 A1 * | 3/2019 | H04W 36/0072 |
| CN | 109496455 A * | 3/2019 | H04L 27/26025 |
| EP | 3 528 418 A1 * | 8/2019 | H04L 5/00 |
| EP | 3 979 742 A1 * | 4/2022 | H04W 72/06 |
| RU | 2433538 C2 | 11/2011 | |
| RU | 2546564 C2 | 4/2015 | |
| RU | 2683977 C1 | 4/2019 | |
| WO | WO 2018/082404 A1 * | 9/2017 | H04L 25/02 |
| WO | WO 2019/084570 A1 * | 5/2019 | H04L 5/00 |
| WO | WO 2020/033675 A1 * | 2/2020 | H04B 7/185 |

OTHER PUBLICATIONS

Russian Decision on Grant issued in corresponding RU Patent Application No. 2022105766, dated Mar. 1, 2023, 20 pages. English translation included.

Russian Office Action issued in corresponding RU Patent Application No. 2022105766, dated Oct. 24, 2022, 12 pages. English translation included.

Chinese Decision on Grant issued in corresponding CN Patent Application No. 201980099187.6, dated Jan. 19, 2023, 4 pages. English translation included.

Chinese Office Action issued in corresponding CN Patent Application No. 201980099187.6, dated Oct. 21, 2022, 23 pages. English translation included.

European Search Report for EP Patent Application No. 19941704.9, dated Jun. 24, 2022, 14 pages.

Korean office action issued in KR Patent Application No. 10-2022-7007706, dated Aug. 27, 2024, 7 pages. English translation included.

Mitsubishi Electric, "Views on pre-emption for UL inter/intra UE Tx multiplexing," 3GPP TSG RAN WG1 Ad-Hoc Meeting, R1-1900639, Taipei, Taiwan, Jan. 21-25, 2019, 8 pages.

Samsung, "On UE adaptation Schemes," 3GPP TSG RAN WG1 Ad-Hoc Meeting 1901, R1-1901087, Taipei, Taiwan, Jan. 21-25, 2019, 13 pages.

Samsung, "On UE adaptation Schemes," 3GPP TSG RAN WG1 RAN1 Meeting #96, R1-1902318, Athens, Greece, Mar. 1-25, 2019, 15 pages.

\* cited by examiner

1210

Receiving, by a user device, from a network device, a configuration message including a threshold or location information that is used to assist a transmission resource switching among sets of resources.

FIG. 12

TRANSMISSION RESOURCE SWITCHING

CROSS-REFERENCE TO RELATED APPLICATIONS

This application is a continuation of International Patent Application No. PCT/CN2019/099962, filed on Aug. 9, 2019, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for transmission resource switching techniques. Some techniques proposed in the disclosed technology may be implemented in non-terrestrial networks. The disclosed technology describes methods that can be implemented at a plurality of mobile devices (or terminals, or user equipment) or a plurality of networks (such as a satellite, airborne vehicle) and save signaling cost in transmission resource switching.

In one aspect, a wireless communication method is disclosed. The method includes configuring, by a network device, a configuration message to facilitate a transmission resource switching among sets of resources; and communicating, by the network device, with a user device to perform the transmission resource switching.

In another aspect, a wireless communication method is disclosed. The method includes receiving, from a network device, a configuration message including timer information that indicates time for a user device to stay in a corresponding resource; and performing a transmission resource switching among sets of resources based on the timer information.

In another aspect, a wireless communication method is disclosed. The method includes receiving, by a user device, from a network device, a configuration message including a threshold or location information that is used to assist a transmission resource switching among sets of resources.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

BRIEF DESCRIPTION OF THE DRAWINGS

FIGS. 10-12 show examples of wireless communication schemes based on some implementations of the disclosed technology.

DETAILED DESCRIPTION

The disclosed technology provides implementations and examples of transmission resource switching techniques. In wireless communications such as NTN scenarios with highly mobility of satellites, some implementations of proposed techniques allow a transmission resource switching among sets of resources. The disclosed technology also provides various implementations on a transmission resource switching such as a timer-based switching, a threshold-based switching, or a location-based switching depending on under which condition a user device performs the transmission resource switching.

With the development of the new radio (NR) access technologies (e.g., 5G), a broad range of use cases including enhanced mobile broadband, massive machine-type communications (MTC), critical MTC, etc., can be realized. To expand the utilization of NR access technologies, 5G connectivity via satellites is being considered as a promising application. In contrast to the terrestrial networks where all communication nodes (e.g., base stations) are located on the earth, a network incorporating satellites and/or airborne vehicles to perform some or all of the functions of terrestrial base stations is referred to as a non-terrestrial network (NTN).

In NTNs, the coverage of a satellite is generally implemented by multiple beams. The beams of a satellite sweep across the coverage area with the movement of the satellite along its orbit. To achieve high throughput, frequency reuse among beams is adopted. For a fixed user equipment (UE), it is served by different beams over time. And the UE needs to switch to different frequency of the corresponding serving beam.

The coverage of a satellite is generally much larger than that of a terrestrial cell. For example, a single satellite beam footprint diameter could be hundreds of kilometers or even larger. In this large coverage, the number of UEs would be large too. If the network informs each UE about the serving frequency change, the signaling overhead would be high due to very large UE number.

The disclosed technology proposes techniques for wireless communications which can reduce signaling overhead in NTN scenarios. The disclosed technology suggests transmission resource switching techniques, when the transmission recourse can be beam or bandwidth part (BWP). Some implementations of the proposed method allow a serving beam switching to be carried out with less signaling cost, which is desirable for NTN scenarios with highly mobility of satellites.

Figure 1:
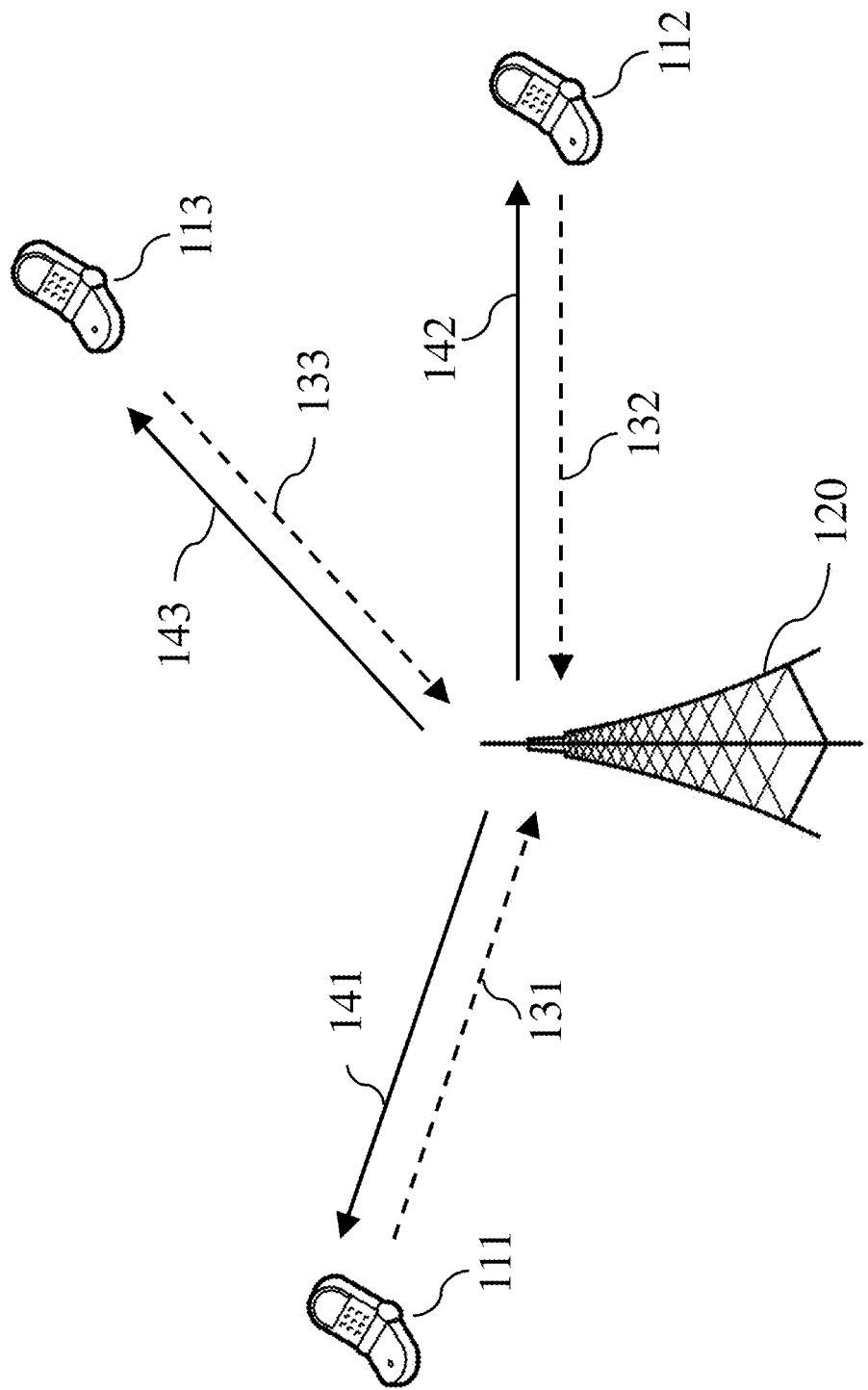
FIG. 1 shows an example of a base station (BS) and user equipment (UE) in wireless communication based on some implementations of the disclosed technology.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
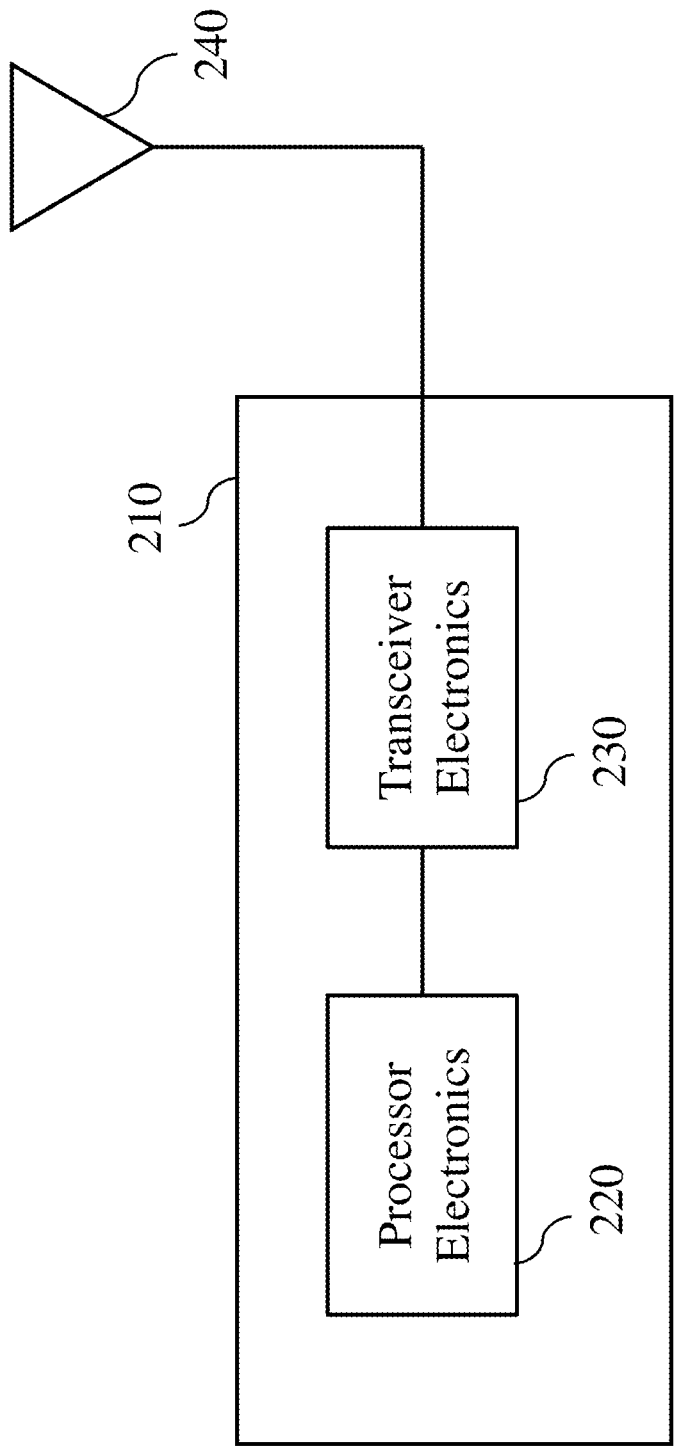
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

The disclosed technology proposes various resource switching techniques. In the below, features and implementations suggested for the transmission resource switching are discussed in more details. Section headings are used in the present document only to facilitate ease of understanding and scope of the embodiments and techniques described in each section are not only limited to that section. Furthermore, while 5G terminology is used in some cases to facilitate understanding of the disclosed techniques, which may be applied to wireless systems and devices that use communication protocols other than 5G or 3GPP protocols.

The resource types used in communication systems may include the followings:

(1) Spatial domain resource, for example, beams. In some implementations, the identifiers of beams further include beam-specific reference signals, antenna port, quasi-co-location configuration, precoder.

(2) Frequency domain resource, for example, a portion of available bandwidth (BWP), or carrier component (CC) in carrier aggregation.

(3) Time domain resource, for example, different frames/slots those are used in semi-persistent scheduling.

The switching among sets of resource may include the followings:

(1) Switching a single type of resource, for examples:
Switching from beam 1 to beam 2, which means a UE changes its monitored beam-specific reference signal.
Switching from BWP 1 to BWP 2, which means a UE changes its active BWP.

(2) Switching multiple types of resource, for examples:
By resource association: In this case, different types of resources are associated to each other. For example, a beam is associated with a corresponding BWP and the switching of either beam or BWP leads to switching both resources of beam and BWP. The association can be achieved by i) including the index of second type of resource as part of configuration parameters of first type of resource, and/or ii) using additional parameters to indicate the relationship By resource set configuration: As an example, a resource set A is defined to comprise beam 1 and BWP 2 and a resource set B compromises beam 2 and BWP 3. The switching from the resource set A to the resource set B leads to both beam and BWP switching defined by each set.

In NR systems, beam operation is involved due to high frequency usage. Though beam is not indicated using an explicit ID, it can be reflected in many aspects like synchronization signal block (SSB), channel State Information-reference signal (CSI-RS), etc. In NR systems, BWP allows a UE with a small bandwidth transceiver to communication with base station (BS) with a large system bandwidth. The BWP switching can be carried out by RRC reconfiguration, bwp-InactivityTimer, PDCCH DCI format 0_1 or 1_1, or RACH-based fallback.

Figure 3B:
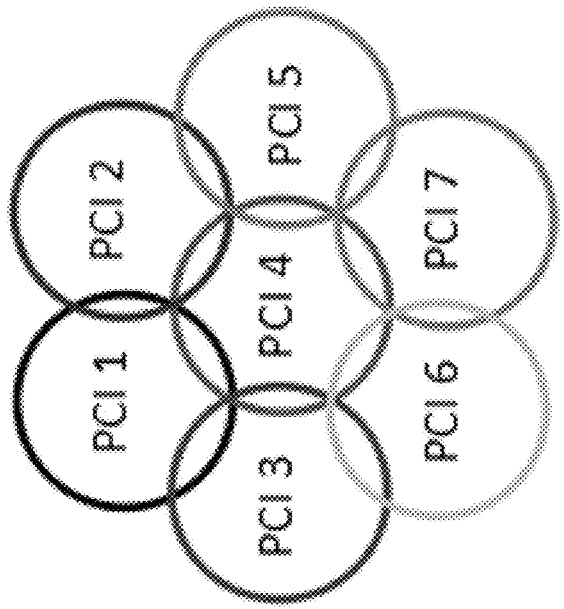
FIGS. 3A and 3B show beams and cells in a NR (New Radio) system.
Figure 3A:
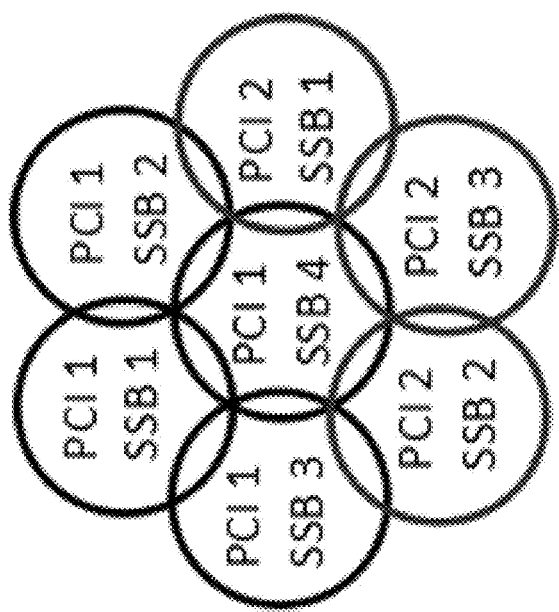

FIGS. 3A and 3B show beams and cells in a NR system. In NR systems, a cell can have a single beam or multiple beams as shown in FIGS. 3A and 3B. In FIG. 3A, the movement of a UE among beams marked by physical cell ID (PCI) can be dealt with intra-cell beam switching, which involves physical layer signaling. In FIG. 3B, the movement of a UE among beams leads to inter-cell handover, which involves higher signaling cost including physical layer and higher layers.

Figure 4:
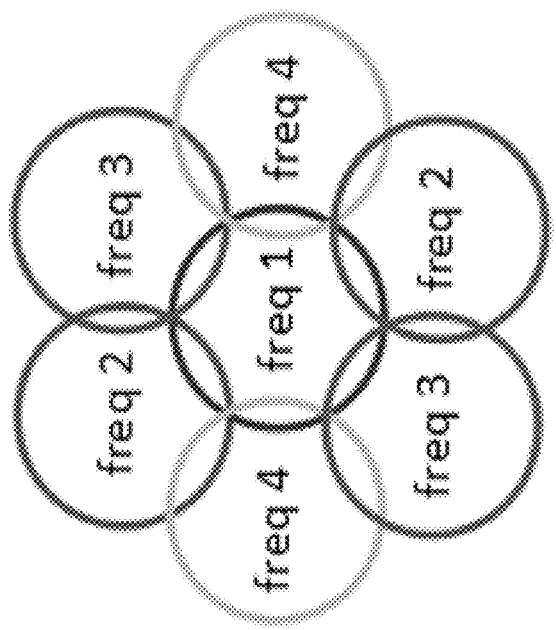
FIG. 4 shows beams and frequency reuse scheme in an HTS (High Throughput Satellites) system.

FIG. 4 shows beams and frequency reuse scheme in a HTS system. In HTS systems, frequency reuse, e.g., four-color reuse in FIG. 4, is a common way to improve efficiency. The relationship between beams and cell is not explicitly specified. As aforementioned, a fixed UE will be served by different beams with different frequency over time. In this case, an appropriate relationship between cell/beam/frequency would be needed to save signaling cost in mobility management.

Figure 5:
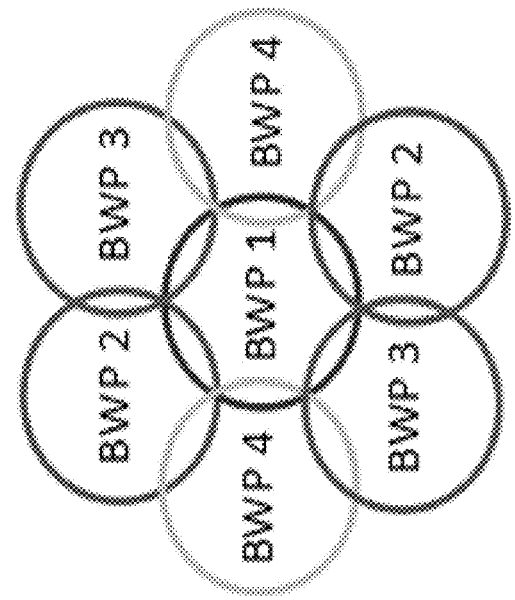
FIG. 5 shows an example on mapping between beams and BWPs (BandWidth Parts) based on some implementations of the disclosed technology.

From the viewpoint of signaling cost in mobility management for NTN scenarios, the beam switching as shown in FIG. 3A is a better choice than the handover as shown in FIG. 3B. On the other hand, to achieve high efficiency, the frequency reuse as shown in FIG. 4 can be used in NTN deployment. In some NTN applications, the beam switching and the frequency resource change happen together. This can be supported by bundling beams and BWPs. A typical four-color frequency reuse and corresponding BWP mapping example is provided in FIG. 5.

In an NTN network, the mobility due to satellite movement is generally the dominant factor. In some use cases, high speed UEs (like aircraft) movement becomes another non-negligible factor. Thanks to the highly predictable satellite orbit and planned airline, the beam/frequency switching due to mobility can be supported by following ways.

Timer-Based Transmission Resource Switching

In an NTN system, the usage of a timer, e.g., bwp-InactivityTimer, can be re-interpreted to automatically switch transmission resource with the predictable relative movement of UE and satellite BS. This method is applicable for fixed/low speed/high speed UEs, as long as the relative track is predictable.

Implementation 1: Timer-Based Transmission Resource Switching

Item 1: In some implementations, network identification information, e.g., Public Land Mobile Network (PLMN) ID, of an NTN system is set different from conventional terrestrial networks. For example, UE uses the PLMN ID to tell whether its serving network is an NTN system.

Figure 6:
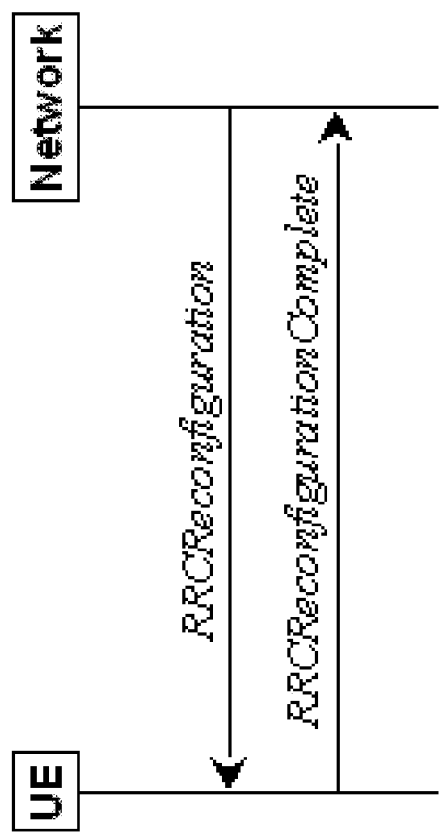
FIG. 6 shows examples of messages communicated between a UE and a network based on some implementations of the disclosed technology.

Item 2: If the serving network is an NTN system, the UE reports information on its location to the network. Depending on the moving speed of UE, additional information on the UE can be provided to the network. In some implementations, if the serving network is the NTT system, a fixed/low speed UE reports its location to the network. In some implementations, if the serving network is the NTT system, a high speed UE reports its location, speed and direction to the network. The network calculates the track of relative movement of the UE. FIG. 6 shows messages communicated between the UE and the network. As shown in FIG. 6, the network can use an RRC reconfiguration to set bwp-InactivityTimer and BWP ID list in beam switching. The details to use the configuration message such as the RRC reconfiguration message are further discussed below.

Figure 7:
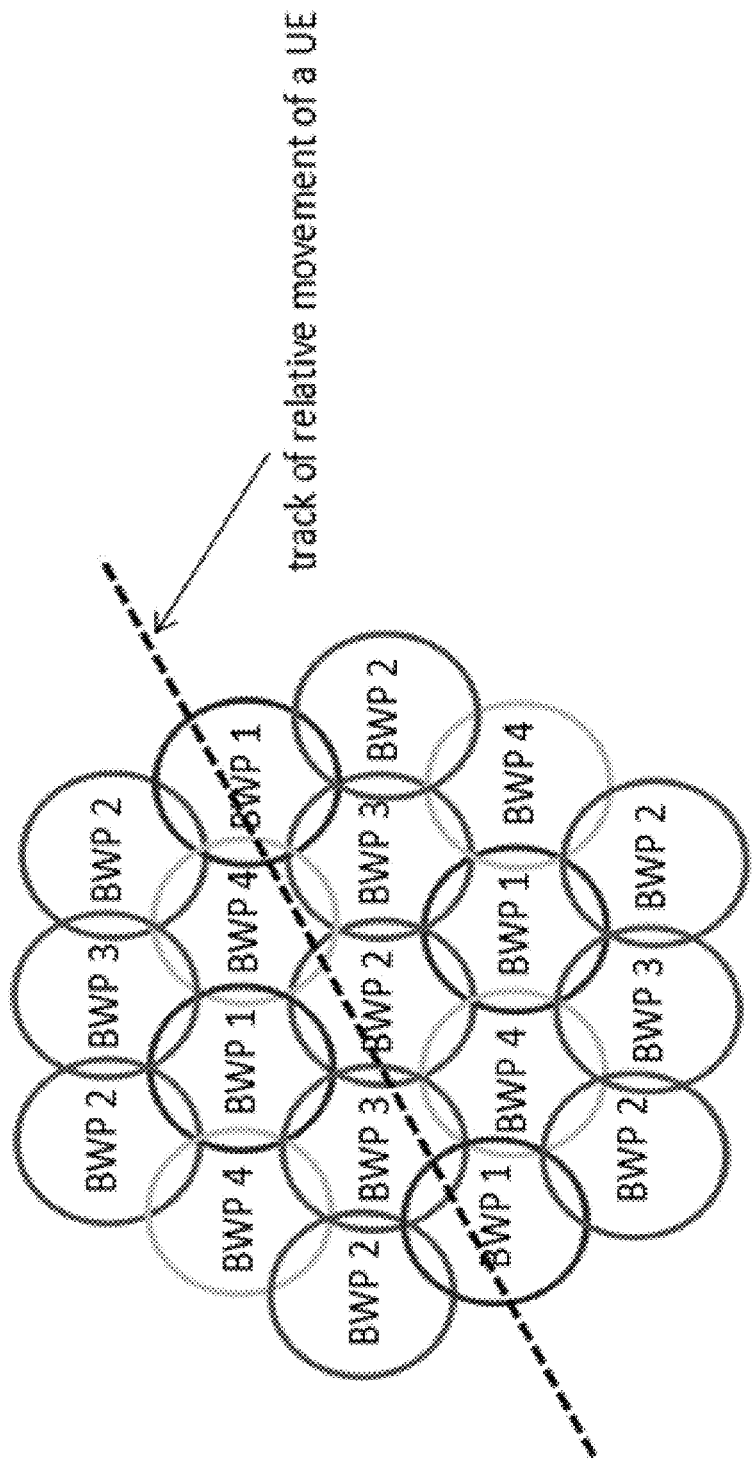
FIG. 7 shows an example of a UE track under a moving satellite based on some implementations of the disclosed technology.

(1) How to Inform UE about the Configuration on Timer-Based Transmission Resource Switching A timer information may be included in a configuration massage such as a RRC reconfiguration message. For example, in RRC reconfiguration message, the information element on a timer, e.g., IE bwp-InactivityTimer, is filled using a path. In some implementations, the path is as follows: RRC reconfiguration→CellGroupConfig→ServingCellConfig→bwp-InactivityTimerList→bwp-InactivityTimer. The timer information included in the configuration message may include one or more timers associated with corresponding resources. The corresponding resources can be either configured by separate signalings or jointly configured with the timer. Thus, in some implementations, the resource is configured by one signaling, which is cell specific. In some implementations, the timer for switching is configured in a UE specific way (2) The Transmission Resource Switching Sequence in NTN Scenarios Though the mobility in an NTN system compromises mobility of satellite and mobility of UE, speed of satellite is a dominant factor. As a result, the UE track considering relative movement would be semi-straight line as shown in FIG. 7. Therefore, the sequence of transmission resource switching can be predicted by the network and the UE (if ephemeris is available). In this example, The UE is served over time by BWP1→BWP3→BWP2→BWP4→BWP1. The sequence of transmission resource switching is reflected by BWP switching sequence of {1,3,2,4}, which is a period over time. To support the transmission resource switching sequence, the information element on cell configuration, e.g., IE ServingCellConfig, includes a new element of bwp-SwitchList to indicate the sequence of BWP switching. In some implementations, the bwp-SwitchList may indicate the sequence of the BWP ID. For example, the definition of bwp-SwitchList is: SEQUENCE (SIZE 4) OF BWP-Id. In the example of FIG. 7, the bwp-SwitchList, which is determined as (1, 3, 2, 4) based on the UE track, has the size of 4. In this example of FIG. 7, the BWP-Id is an INTEGER type, and its value has a range determined by (1 . . . maxNrofBWPsSequence). In this example, maxNrofBWPsSequence is 4. Thus, the BWP-Id has a range between 1 to 4.

(3) How to Determine the Timer Length

Figure 8:
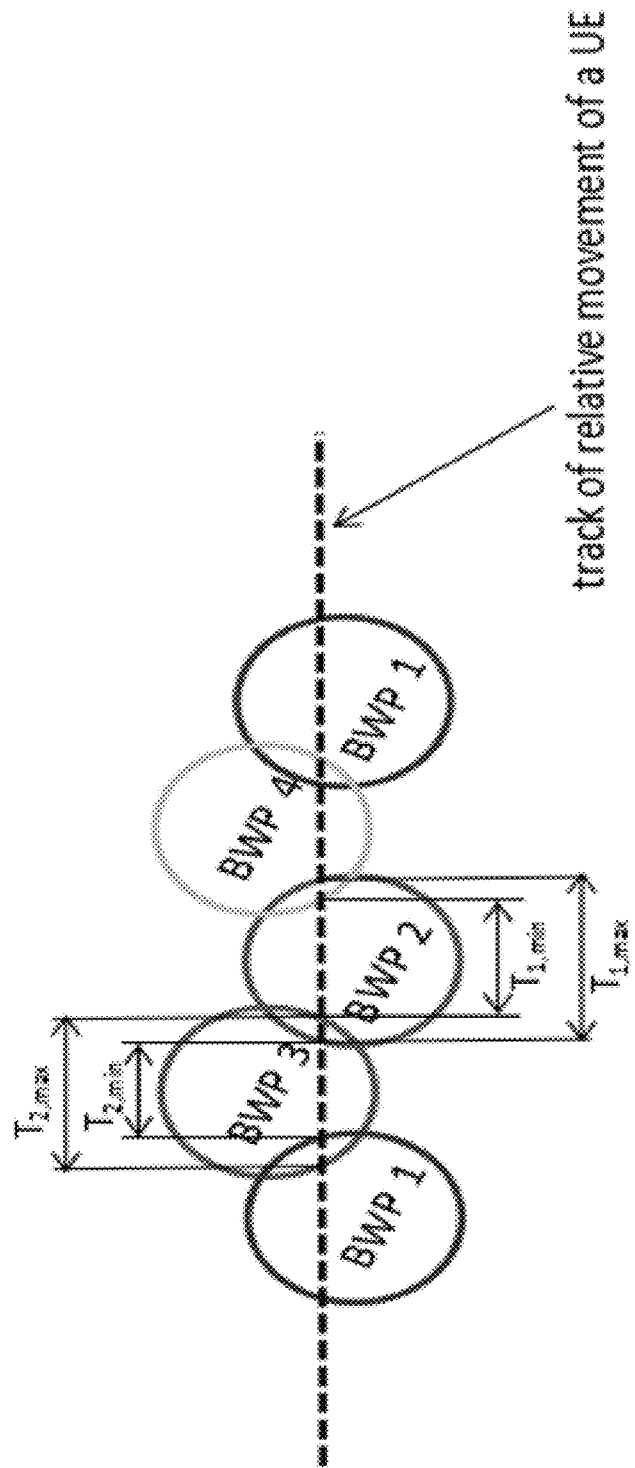
FIG. 8 shows a timer range determined by a UE track under a moving satellite based on some implementations of the disclosed technology.

The length of bwp-InactivityTimer is determined by the network using: predictable UE track, beam diameter and beam overlapping range size. To determining the timer for each UE at a network side, e.g., gNB side, some reporting from the UE side might be needed. For example, the followings are examples of the information needed from the UE:

Tracking of the user device, including routine, speed, or status (e.g., movement, stop). This information needs to be reported to gNB by UE UE capability of location FIG. 8 shows a zoom-in view of beams on a UE's track in FIG. 7. It is easy to know that the serving time T1 of BWP1 and BWP2 is the same, which results from the regular beam deployment. Similarly, the serving time T2 of BWP3 and BWP4 is the same. T1 and T2 are determined by the track length across each beam and the relative speed. The minimum and maximum values of T1 and T2 are illustrated in FIG. 8. The length of timer can be added into IE ServingCellConfig, by a new element of bwp-InactivityTimerList instead of bwp-InactivityTimer. In some implementations, the bwp-InactivityTimerList may indicate the sequence of bwp-InactivityTimer. In the example of FIG. 8, the bwp-InactivityTimer, which is determined as (T1, T2), has the size of 2. In this example of FIG. 8, the bwp-InactivityTimer is an ENUMERATED type, but its range is determined by (min(T1min, T2min), max(T1max, T2max)).

Item 3: The UE receives the RRC reconfiguration message and uses T1 as the timer for its stay in BWP1. When T1 expires, the UE switches to BWP3 and starts timer T2. When T2 expires, the UE switches to BWP2 and starts timer T1. When T1 expires, the UE switches to BWP4 and starts timer T2. When T2 expires, the UE switches to BWP1 and starts timer T1. The timer-based automatic BWP switch happens periodically.

Item 4: After transmission resource switching, the UE monitors DL channels in new transmission resource and conducts its UL transmission in the new transmission resource.

Item 5: After the transmission resource switching, if the UE successfully receives DL (DownLink) signal, e.g., SSB/CSI-RS, on the new BWP, the UE can send report together with measurement to the network as confirmation of success of the transmission resource switching. The content of report can include at least one of CSI of new transmission resource or RSRP (Reference Signal Received Power) of neighboring transmission resource.

Threshold-Based Transmission Resource Switching

Figure 9:
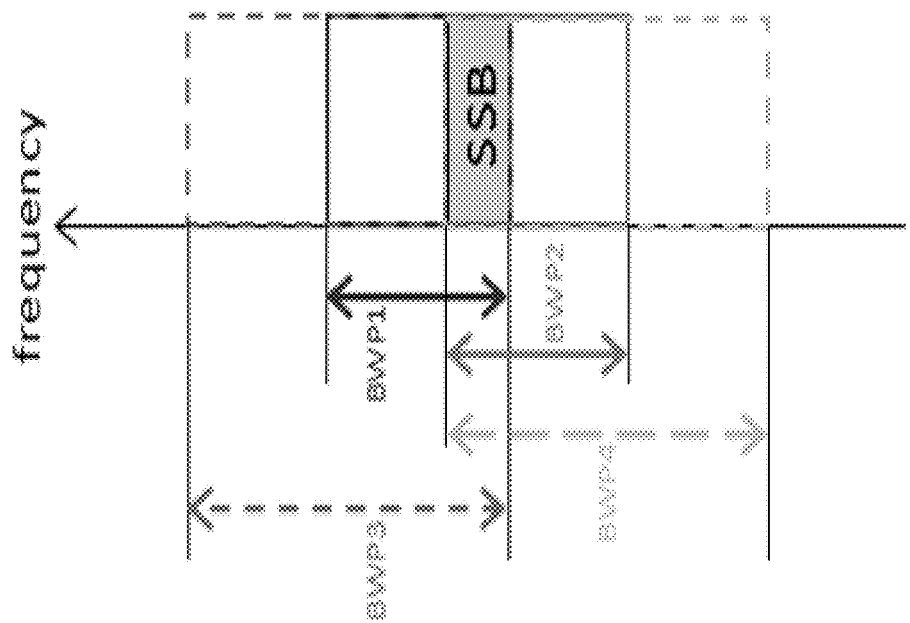
FIG. 9 shows an example of SSB (Synchronization Signal Block) and BWP relationship to facilitate RLM (Radio Link Monitoring) measurement.

In current NR specifications, UE shall monitor the downlink link quality based on the reference signal in the configured Radio Link Monitoring-Reference Signal (RLM-RS) resources. The configured RLM-RS resources can be all SSBs, or all CSI-RSs, or a mix of SSBs and CSI-RSs. In the below, the RLM-RS resources are explained as the example of the configured signal but other signals can be used to monitor the downlink link quality. The UE is not required to perform RLM outside the active DL BWP. In order to reuse the RLM measurement in automatic BWP switch, SSB of current cell shall be covered by different BWPs. Examples of SSB and BWP relationship are given in FIG. 9. A larger BWP bandwidth requires a larger fast Fourier transform (FFT) size at UE side. In this example, though BWP3 includes BWP1, only the non-overlapped part shall be used in beam corresponding to BWP3 to keep a clear frequency reuse pattern. The same principle applies to BWP4, in which only the non-overlapped part (i.e., excluding the frequency resource covered by BWP2) can be used in the beam corresponding to BWP4.

The threshold-based transmission resource switching can be implemented different ways depending on whether it is the UE or the network who makes the decision to switch. In some implementations, the UE carries out an automatic switching. In some other implementations, based on reports from the UE, the network device determines whether to perform a switching and provides the UE an instruction for the switching. The following descriptions are provided for each of the cases.

Implementation 2: Automatic Switching by User Device

Item 1: In some implementations, network identification information, e.g., PLMN ID, of an NTN system is set different from conventional terrestrial networks. For example, UE uses the network identification information, e.g., the PLMN ID, to tell whether its serving network is an NTN system.

Item 2: If the serving network is an NTN system, the UE reports its capability to network. In the UE's capability report, its supported maximum bandwidth of BWP (or largest FFT size) is included. If the maximum BWP bandwidth supported by UE is no less than the system BWP deployment, the UE can use RLM measurement to carry out BWP (beam) switching automatically.

Item 3: For a UE with capability to support BWP (beam) switching automatically with RLM measurement, the network uses RRC reconfiguration to set BWP ID list for automatic beam switching. The example of the message flow using the RRC reconfiguration message has been already discussed with FIG. 6 above.

In the example of the threshold-based transmission resource switching, the configuration message, e.g., IE ServingCellConfig, may contain a new element of bwp-SwitchList to indicate the switchable BWP ID list. For example, the definition of bwp-SwitchList is: SEQUENCE (SIZE 4) OF BWP-Id. In the example shown in FIG. 9, if the UE capability supports all four BWPs' bandwidth, the bwp-SwitchList is a list of (1, 2, 3, 4), which is the BWP ID list in current cell deployment. If the UE capability supported only part of four BWPs' bandwidth, the bwp-SwitchList is a list of corresponding BWP ID set.

The definition of BWP-Id may still be an INTEGER type, and the BWP-Id may have a range determined as (1 . . . maxNrofBWPsSequence). In this example, maxNrofBWPsSequence=4, which is determined by frequency reuse factor. Thus, the BWP-Id has a range between 1 to 4.

In another example of the threshold-based transmission resource switching, the configuration message, e.g., IE ServingCellConfig, may contain a new element of bwp-SwitchThreshold to indicate condition of automatic BWP switching. The definition of bwp-SwitchThreshold is an INTEGER type, its unit can be dB to indicate the gap between downlink radio link quality of serving beam and neighboring beams.

Item 4: The UE receives the RRC reconfiguration message from network. The UE uses bwp-SwitchList as the BWP ID set supporting automatic BWP switching.

Item 5: The UE shall monitor the downlink link quality based on the reference signal in the configured RLM-RS resource(s) in order to detect the downlink radio link quality of current serving beam and neighboring beams. The configured RLM-RS resources can be all SSBs, or all CSI-RSs, DMRS (Demodulation Reference Signal), or a mix of SSBs, CSI-RSs and DMRS. The downlink link quality is named $M_{bwp\_id}$.

Item 6: The configured RLM-RS resources are associated with each transmission resource. In some implementations, the association can be made by providing a transmission resource ID in a reference signal (set) ID. In some implementations, the association can be made by mapping between the transmission resource ID and the reference signal (set) ID.

Item 7: On each RLM-RS resource, the UE shall estimate the downlink radio link quality of different BWPs in the bwp-SwitchList. The downlink radio link quality measurement can be obtained by one-time measurement or a long-term averaged measurement.

Item 8: The UE shall compare of downlink radio link quality of current serving BWP and that of neighboring BWPs. As an example, the following comparison rules can be used to determine whether to perform a transmission resource switching.

(1) If $M_{serving\_BWP}$<bwp-SwitchThreshold and at least one of $M_{neighboring\_BWP}$>bwp-SwitchThreshold, the UE automatically switches to a new resource, e.g., BWP and/or beam, the new resource corresponding to the largest $M_{neighboring\_BWP}$.

(2) If $M_{serving\_BWP}$<bwp-SwitchThreshold+offset1 and at least one of $M_{neighboring\_BWP}$>bwp-SwitchThreshold, the UE automatically switches to a new resource, e.g., BWP and/or beam, the new resource corresponding to the largest $M_{neighboring\_BWP}$.

(3) If $M_{serving\_BWP}$<bwp-SwitchThreshold+offset1 and at least one of $M_{neighboring\_BWP}$>bwp-SwitchThreshold+ offset2, the UE automatically switches to a new resource, e.g., BWP and/or beam, the new resource corresponding to the largest $M_{neighboring\_BWP}$.

(4) If $M_{serving\_BWP}$<bwp-SwitchThreshold+offset1, the UE automatically switches to a new resource with a channel quality within a certain range and provides the shortest distance between the user device and a reference location of the candidate resource.

Item 9: After transmission resource switching, if the UE successful received DL signal such as SSB/CSI-RS on the new BWP, it can notify the network device of a success of the switching. Some examples to notify the network device are provided as follows:

(1) The UE may send report together with measurement to the network as confirmation of the success of the switching. The content of the report can include CSI of new transmission resource or RSRP of neighboring transmission resource.

(2) The UE may trigger a BSR (buffer state report).

(3) The UE may trigger a CSI report.

(4) The UE may initialize a content-free RACH (or 2-STEP RACH including the UE Id in the MSG-A).

Implementation 3: Switching Instructed by Network Device Based on Reporting from UE Items 1-5 of the automatic switching by the user device, which have been discussed above, can be applied to the present implementation for realizing the switching instructed by the network device as well.

Item 6: On each RLM-RS resource, the UE shall estimate the downlink radio link quality of different BWPs in the bwp-SwitchList. The UE shall compare of downlink radio link quality of current serving BWP and that of neighboring BWPs. The report of UE is made based on the following methods:

(1) If $M_{serving\_BWP}$<bwp-SwitchThreshold and at least one of $M_{neighboring\_BWP}$>bwp-SwitchThreshold, the UE reports $M_{serving\_BWP}$ and the largest $M_{neighboring\_BWP}$ together with corresponding BWPs.

(2) If $M_{serving\_BWP}$<bwp-SwitchThreshold+offset1 and at least one of $M_{neighboring\_BWP}$>bwp-SwitchThreshold, the UE reports $M_{serving\_BWP}$ and the largest $M_{neighboring\_BWP}$ together with corresponding BWPs.

(3) If $M_{serving\_BWP}$<bwp-SwitchThreshold+offset1 and at least one of $M_{neighboring\_BWP}$>bwp-SwitchThreshold+offset2, the UE reports $M_{serving\_BWP}$ and the largest $M_{neighboring\_BWP}$ together with corresponding BWPs.

(4) If $M_{serving\_BWP}$<bwp-SwitchThreshold+offset1, the UE reports $M_{neighboring\_BWP}$ of the candidate resource whose channel quality is within a certain range and provides the shortest distance between the user device and a reference location of the candidate resource.

Item 7: In some implementations, the network device uses (i) RRC reconfiguration, (ii) PDCCH DCI format 0_1, or (iii) PDCCH DCI format 1_1 to inform the UE to switch BWP if needed. In some implementations, the network device may instruct the switching to the resource that has been previously reported by the UE. In some implementations, the network device may instruct the switching to a resource determined by the network device, in which the resource can be: (i) one of the candidate resource reported by UE, or (ii) a resource determined by the network device regardless of what the UE has reported.

Location-Based Transmission Resource Switching

In NTN system, the location of a beam center changes as a satellite moves along its orbit. The main idea of location-based transmission resource switching uses a distance between a UE and the location of the beams center to find the best beam for the UE. To facilitate location-based transmission resource switching, following information shall be available at the UE side:

The location of beams center obtained from DL broadcast by the network.

The location of UE itself and the dimension of this location, i.e., 2D or 3D.

Accuracy of the UE's location.

The location-based transmission resource switching can be implemented different ways depending on whether it is the distance only to be considered for the automatic switching of the UE. In some implementations, the UE performs an automatic switching based on a distance only. In some other implementations, the UE performs an automatic switching based on a distance and a threshold. The following descriptions are provided for each of the cases.

Implementation 4: Automatic Switching by UE Based on Distance Only

Item 1: In some implementations, network identification information, e.g., PLMN ID, of an NTN system is set different from conventional terrestrial networks. For example, UE uses the network identification information, e.g., PLMN ID, to tell whether its serving network is an NTN system.

Item 2: If the serving network is an NTN system, the UE reports its capability to network. If the UE has its location information, the location information shall be included in the UE's capability report. The location dimension (2D or 3D including height information) shall be reported to the network as well. The accuracy of the location information shall be reported to the network if available.

Item 3: If the UE is capable to report its location with enough accuracy, the network can configure a distance range to the UE. The UE can use a distance calculation to carry out BWP (beam) switching automatically.

Item 4: For a UE with capability to support BWP (beam) switching automatically with distance measurement, the network may use RRC reconfiguration as shown in FIG. 6 to set BWP ID list for automatic beam switching. The content of configuration message is described below.

(1) In IE ServingCellConfig contains a new element of bwp-SwitchList to indicate the switchable BWP ID list.

The definition of bwp-SwitchList is: SEQUENCE (SIZE 4) OF BWP-Id. In the example shown in FIG. 7, if the UE capability supported all four BWPs' bandwidth, the bwp-SwitchList is a list of (1, 2, 3, 4), which is the BWP ID list in current cell deployment. If the UE capability supported only part of four BWPs' bandwidth, the bwp-SwitchList is a list of corresponding BWP ID set.

The definition of BWP-Id is still an INTEGER type, but its value range is determined as (1 . . . maxNrofBWPsSequence). In this example, maxNrofBWPsSequence=4, which is determined by frequency reuse factor. Thus, the BWP-ID has the range between 1 to 4.

(2) In IE ServingCellConfig contains a new element of bwp-SwitchDistance to indicate condition of automatic BWP switching.

The definition of bwp-SwitchDistance is an INTEGER type, its unit can be km to indicate the valid distance range between UE and beam center location.

Item 5: The UE receives the RRC reconfiguration message from network. The UE uses bwp-SwitchList as the BWP ID set supporting automatic BWP switching.

Item 6: The UE shall monitor the DL broadcast including beams center location. The UE calculates the distance of itself to the beams center location. The distance is named Dbwp_id.

Item 7: The UE shall compare distance between (i) its location and the beam center location of current serving beam and (ii) its location and the beam center location of neighboring beams corresponding to different BWPs. It can use following comparison rules to determine whether to perform the transmission resource switching. In some implementations, if the distance between the UE and the current beam center location is not the shortest, the UE switches to the candidate resource with shortest distance. In some implementations, if the distance between the UE and the current beam center location exceeds the associated range, the UE switches to the candidate resource with the shortest distance.

Item 8: After transmission resource switching, if the UE successfully receives DL signal such as SSB/CSI-RS on the new BWP, it can notify the network device of a success of the switching. Some examples to notify the network device are provided as follows:

(1) The UE may send report together with measurement to the network as confirmation of the success of the switching. The content of the report can include CSI of new transmission resource or RSRP of neighboring transmission resource.

(2) The UE may trigger the BSR (buffer state report).

(3) The UE may trigger the CSI report.

(4) The UE may initialize a content-free RACH (or 2-STEP RACH including the UE Id in the msg-a).

Implementation 5: Automatic Switching by UE Based on Distance and Threshold

In some implementations, items 1-7 of the automatic switching by the user device (Implementation 2) can be applied to the present implementation for realizing the automatic switching by the user device based on the distance and the threshold. In some other implementations, items 1-4 of the automatic switching by the user device based on the distance only (Implementation 4) can be applied to the present implementation for realizing the automatic switching by the user device based on the distance and the threshold.

The UE shall compare of distance current serving beam and that of neighboring beams, corresponding to different BWPs. The UE shall compare the DL link quality of current BWP and neighboring BWPs.

If Mserving_BWP<bwp-SwitchThreshold and at least one of Mneighboring_BWP>bwp-SwitchThreshold, the UE switches to the beam with shortest distance.

Figure 10:
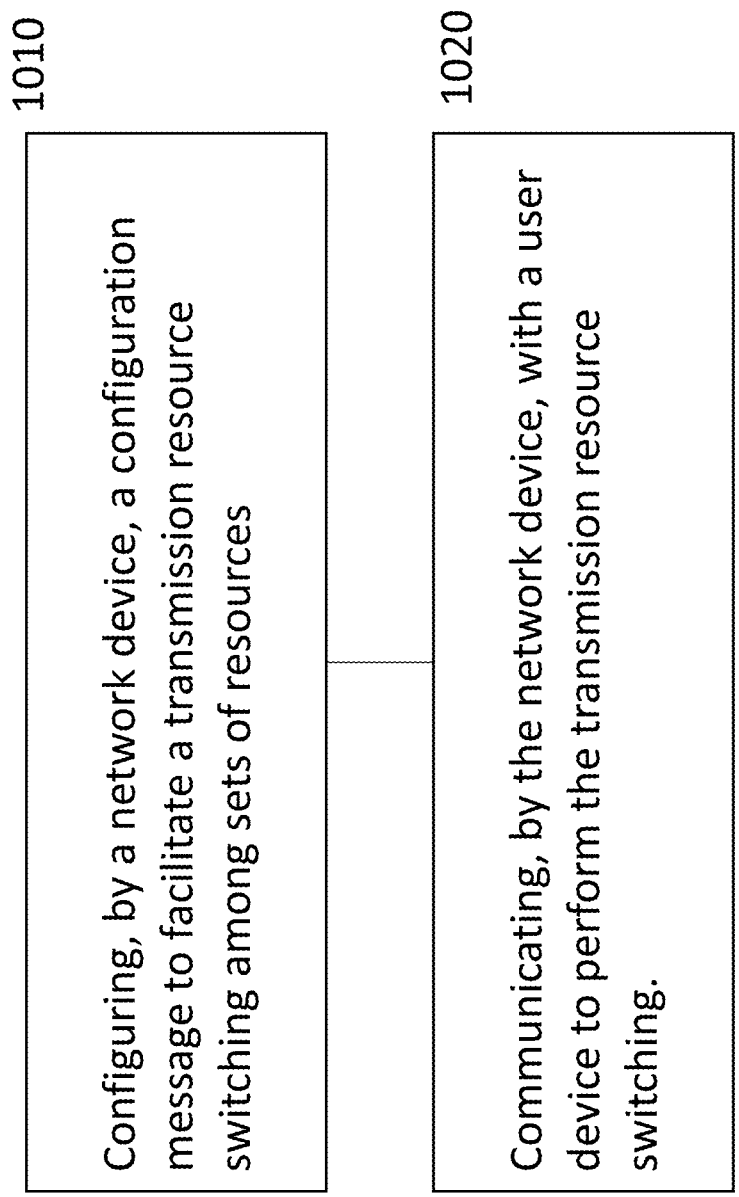
Figure 11:
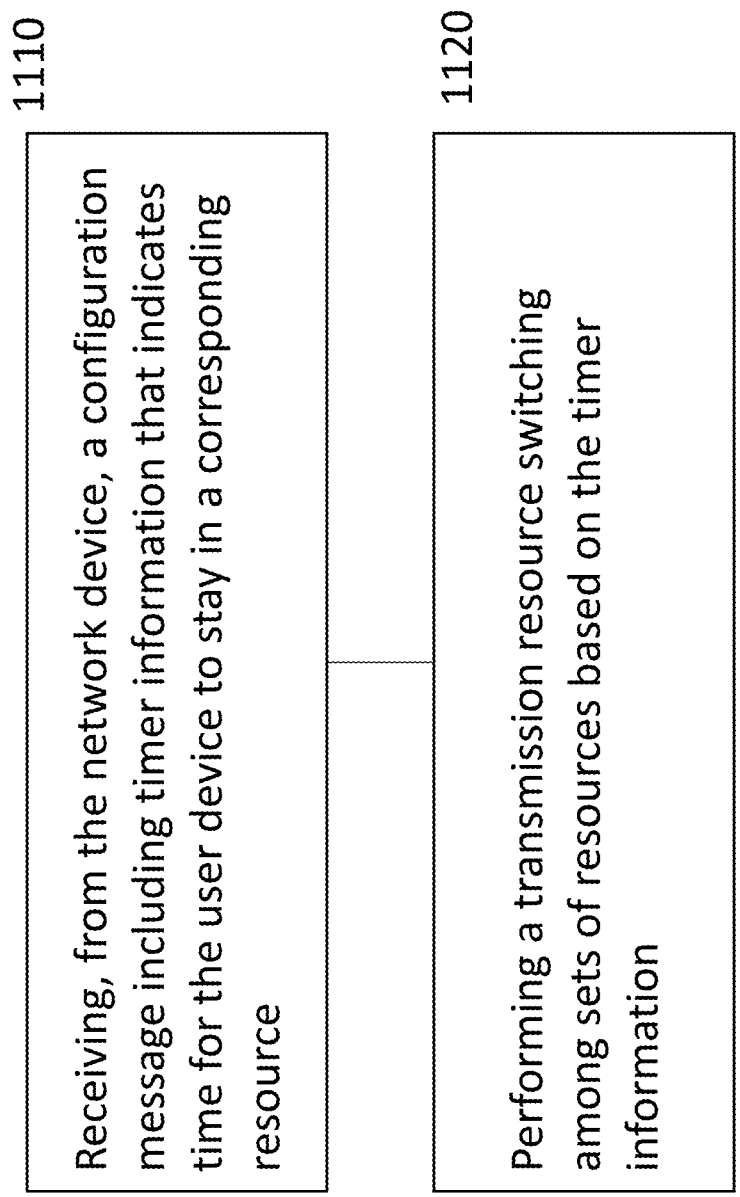

FIGS. 10-12 show examples of wireless communication schemes based on some implementations of the disclosed technology.

The wireless communication scheme as shown in FIG. 10 includes configuring (S1010), by a network device, a configuration message to facilitate a transmission resource switching among sets of resources, and communicating (S1020), by the network device, with a user device to perform the transmission resource switching.

The wireless communication scheme as shown in FIG. 11 includes receiving (S1110), from the network device, a configuration message including timer information that indicates time for the user device to stay in a corresponding resource, and performing (S1120) a transmission resource switching among sets of resources based on the timer information The wireless communication scheme as shown in FIG. 12 includes receiving (S1210), by a user device, from a network device, a configuration message including a threshold or location information that is used to assist a transmission resource switching among sets of resources Additional features and embodiments of the above-described methods/techniques may be preferred features of some embodiments and are described below using a clause-based description format.

1. A wireless communication method, comprising: configuring, by a network device, a configuration message to facilitate a transmission resource switching among sets of resources; and communicating, by the network device, with a user device to perform the transmission resource switching. The network device may include the BS 120 as shown in FIG. 1 and the user device may include the UE as shown in FIG. 1. In some implementations, the resource transmission switching may include the switching as mentioned in [0032] to [0038] of this patent document. In some implementations, the resources may include resources as described in [0028]-[0031] of this patent document.

2. The wireless communication method of clause 1, wherein i) the sets of resources include spatial domain resources, ii) the sets of resources include frequency domain resources, or iii) the sets of resources include time domain resources.

3. The wireless communication method of clause 1, wherein the transmission resource switching includes i) switching among single domain resources or ii) switching among multiple domain resources.

4. The wireless communication method of clause 1, wherein the configuring including configuring the configuration message to include timer information to cause the transmission resource switching to occur based on the timer information.

5. The wireless communication method of clause 4, wherein the timer information includes one or more timers associated with corresponding resources.

6. The wireless communication method of clause 5, further comprising: determining, by the network device, a length of a timer based on at least one of a track of the user device, a beam diameter, or a beam overlapping range size.

7. The wireless communication method of clause 1, wherein the configuring including configuring the configuration message to include an element indicating a sequence of the transmission resource switching, the sequence including one or more resource set IDs that have served the user device.

8. The wireless communication method of clause 1, wherein the configuring includes configuring the configuration message to include a threshold or location information that is used to assist the transmission resource switching.

9. The wireless communication method of clause 8, wherein the threshold can include at least one of i) RSRP (Reference Signal Received Power), ii) RSRQ (Reference Signal Received Quality), iii) SINR (Signal to Interference and Noise Ratio), or iv) offset value.

10. The wireless communication method of clause 1, wherein the configuring includes configuring the configuration message to include a resource ID list indicating candidate resources for the transmission resource switching.

11. The wireless communication method of clause 8, wherein the location information further includes at least one of i) reference location of a corresponding resource, ii) a distance threshold, or iii) a distance offset.

12. The wireless communication method of clause 1, wherein the configuration message is an RRC (Radio Resource Control) reconfiguration message.

13. A wireless communication method including: receiving, from a network device, a configuration message including timer information that indicates time for a user device to stay in a corresponding resource; and performing a transmission resource switching among sets of resources based on the timer information. The configuration message may include a RRC configuration message as described in the present document. In some implementations, the transmission resource switching among sets of resources based on the timer information can include the timer-based transmission resource switching as described in the present document.

14. The wireless communication method of clause 13, wherein the sets of resources include at least one of i) spatial domain resources, ii) frequency domain resources, or iii) time domain resources.

15. The wireless communication method of clause 13, wherein the transmission resource switching includes i) switching among single domain resources or ii) switching among multiple domain resources.

16. The wireless communication method of clause 13, further compromising at least one of: transmitting, to the network device, location information of the user device; or transmitting, to the network device, track information of the user device;

17. The wireless communication method of clause 13, further comprising, after the performing of the transmission resource switching: transmitting, by the user device, measurements including at least one of channel state information (CSI) of a transmission resource or reference signal received power (RSRP) of neighboring transmission resources.

18. The wireless communication method of clause 13, further comprising, after the performing of the transmission resource switching: initializing a timer information to measure time to stay in a resource switched; and switching to another resource once the time has expired, wherein the configuration message includes information on another resource.

19. The wireless communication method of clause 13, further comprising performing an uplink transmission using another resource.

20. The wireless communication method of clause 13, wherein the timer information includes an inactivity timer associated with the corresponding resource, the inactivity timer having a length determined by the network device based on at least one of a track of the user device, a beam diameter, or a beam overlapping range size.

21. The wireless communication method of clause 13, wherein the transmission resource switching includes a bandwidth part (BWP) switching and the configuration message includes an element indicating a sequence of the BWP switching, the sequence including one or more BWP IDs that have served the user device.

22. A wireless communication method including: receiving, by a user device, from a network device, a configuration message including a threshold or location information that is used to assist a transmission resource switching among sets of resources. The configuration message may include RRC configuration message as described in the present document and the transmission resource switching among sets of resources can include the threshold-based transmission resource or the location-based transmission resource switching as described in the present document.

23. The wireless communication method of clause 22, further comprising: monitoring a downlink quality based on a reference signal including at least one of i) SSB (Synchronization Signal Block), ii) CSI-RS (Channel State Information-Reference Signal for tracking), iii) CSI-RS for CSI (Channel State Information), iv) CSI-RS for BM (Beam Management), or v) DM-RS (Demodulation Reference Signal).

24. The wireless communication method of clause 23, wherein the reference signal is associated with each transmission resource by providing a transmission resource ID in a reference signal ID or mapping between the transmission resource ID and the reference signal ID.

25. The wireless communication method of clause 23, wherein the monitoring of the downlink quality includes measuring an average quality during a period on configured resources associated with the set of resources.

26. The wireless communication method of clause 22, further comprising comparing a quality of a current resource with qualities of candidate resources, and i) upon a determination that the quality of the current resource is less that the threshold, switching to a candidate resource with a best quality, ii) upon a determination that the quality of the current resource is less than a sum of the threshold and a certain offset, switching to the candidate resource with the best quality, iii) upon a determination that the quality of the current resource is less than the sum of the threshold and a first offset, switching to the candidate resource with the best quality that is greater than the sum of the threshold and a second offset, or iv) upon a determination that the quality of the current resource is less than the sum of the threshold and a third, switching to the candidate resource with a channel quality within a certain range and the shortest distance between the user device and a reference location of the candidate resource.

27. The wireless communication method of clause 22, further comprising notifying the network device of a success of the transmission resource switching.

28. The wireless communication method of clause 27, wherein the notifying includes i) sending a report with measurements to the network device, ii) triggering a BSR (Buffer State Report), iii) triggering a CSI (Channel State Information) report, or iv) initializing a content-free RACH (Random Access Procedure) or 2-step RACH including a user device ID.

29. The wireless communication method of clause 22, further comprising: determining, by the user device, whether a channel quality satisfies a predefined condition; reporting, to the network device, a downlink link quality of a current resource and a downlink link quality of a candidate resource; and receiving an indication, from the network device, to switch the current resource to another resource.

30. The wireless communication method of clause 22, further comprising: reporting, by the user device, capability information on the user device, to the network device.

31. The wireless communication method of clause 29, further comprising: i) upon a determination that the distance between the user device and a reference location of a current resource is not the shortest, switching to a candidate resource that provides the shortest distance between the user device and a reference location of the candidate resource; ii) upon a determination that the distance between the user device and the reference location of the current resource exceeds a predetermined range, switching to the candidate resource that provides the shortest distance between the user device and the reference location of the candidate resource; or iii) upon a determination that a quality of the current resource is less than a sum of the threshold and a certain offset, switching to a candidate resource with a channel quality within a certain range and providing the shortest distance between the user device and the reference location of the candidate resource.

32. A communication apparatus comprising a processor configured to implement a method recited in any one or more of clauses 1 to 31.

33. A computer readable medium having code stored thereon, the code, when executed, causing a processor to implement a method recited in any one or more of clauses 1 to 31.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
configuring, by a network device, a configuration message including information for a transmission resource switching among sets of resources, wherein each set of resources is associated with a first type of resource and a second type of resource and the transmission resource switching causes the first type of resource and the second type of resource to be switched to corresponding resources; and
communicating, by the network device, with a user device to perform the transmission resource switching, and
wherein the configuration message includes an element indicating a sequence of the transmission resource switching for the first type of resource, the sequence including multiple resource identifications (IDs) in a particular order such that the first type of resource is switched among different ranges corresponding to the multiple resource IDs according to the particular order.

2. The wireless communication method of claim 1, wherein i) the sets of resources include spatial domain resources, ii) the sets of resources include frequency domain resources, or iii) the sets of resources include time domain resources.

3. The wireless communication method of claim 1, wherein the configuring including configuring the configuration message to include at least one of 1) timer information to cause the transmission resource switching to occur based on the timer information, 2) a threshold or location information that is used to assist the transmission resource switching, or 3) a resource ID list indicating candidate resources for the transmission resource switching.

4. The wireless communication method of claim 3, wherein the timer information includes one or more timers associated with corresponding resources.

5. The wireless communication method of claim 4, further comprising:
determining, by the network device, a length of a timer based on at least one of a track of the user device, a beam diameter, or a beam overlapping range size.

6. The wireless communication method of claim 3, wherein the threshold can include at least one of i) RSRP (Reference Signal Received Power), ii) RSRQ (Reference Signal Received Quality), iii) SINR (Signal to Interference and Noise Ratio), or iv) offset value.

7. The wireless communication method of claim 3, wherein the location information further includes at least one of i) reference location of a corresponding resource, ii) a distance threshold, or iii) a distance offset.

8. The wireless communication method of claim 1, wherein the configuration message is an RRC (Radio Resource Control) reconfiguration message.

9. A wireless communication method including:
receiving, by a user device, from a network device, a configuration message including information for a transmission resource switching among sets of resources, wherein each set of resources is associated with a first type of resource and a second type of resource and the transmission resource switching causes the first type of resource and the second type of resource to be switched to corresponding resources; and
performing the transmission resource switching among the sets of resources based on the information, and
wherein the configuration message includes an element indicating a sequence of the transmission resource switching for the first type of resource, the sequence including multiple resource identifications (IDs) in a particular order such that the first type of resource is switched among different ranges corresponding to the multiple resource IDs according to the particular order.

10. The wireless communication method of claim 9, wherein the sets of resources include at least one of i) spatial domain resources, ii) frequency domain resources, or iii) time domain resources.

11. The wireless communication method of claim 9, further compromising at least one of:
transmitting, to the network device, location information of the user device;
transmitting, to the network device, track information of the user device; or
performing an uplink transmission using another resource.

12. The wireless communication method of claim 9, further comprising, after the performing of the transmission resource switching:
  transmitting, by the user device, measurements including at least one of channel state information (CSI) of a transmission resource or reference signal received power (RSRP) of neighboring transmission resources.

13. The wireless communication method of claim 9, further comprising, after the performing of the transmission resource switching:
  initializing a timer information to measure time to stay in a resource switched; and
  switching to another resource according to the particular order once the time measured has expired, wherein the configuration message includes information on another resource.

14. The wireless communication method of claim 9, wherein the transmission resource switching includes a bandwidth part (BWP) switching and the configuration message includes an element indicating a sequence of the BWP switching, the sequence including one or more BWP IDs that have served the user device.

15. The wireless communication method of claim 9,
  wherein the information corresponds to a threshold or location information that indicates threshold condition or location condition for the transmission resource switching.

16. The wireless communication method of claim 15, further comprising monitoring a downlink quality based on a reference signal included in the configuration message, wherein the reference signal includes at least one of i) SSB (Synchronization Signal Block), ii) CSI-RS (Channel State Information-Reference Signal for tracking), iii) CSI-RS for CSI (Channel State Information), iv) CSI-RS for BM (Beam Management), or v) DM-RS (Demodulation Reference Signal) and wherein the reference signal is associated with each transmission resource by providing a transmission resource ID in a reference signal ID or mapping between the transmission resource ID and the reference signal ID.

17. The wireless communication method of claim 15, further comprising comparing a quality of a current resource with qualities of candidate resources, and
  i) upon a determination that the quality of the current resource is less that the threshold, switching to a candidate resource with a best quality,
  ii) upon a determination that the quality of the current resource is less than a sum of the threshold and a certain offset, switching to the candidate resource with the best quality,
  iii) upon a determination that the quality of the current resource is less than the sum of the threshold and a first offset, switching to the candidate resource with the best quality that is greater than the sum of the threshold and a second offset, or
  iv) upon a determination that the quality of the current resource is less than the sum of the threshold and a third offset, switching to the candidate resource with a channel quality within a certain range and a shortest distance between the user device and a reference location of the candidate resource.

18. The wireless communication method of claim 15, further comprising:
  notifying the network device of a success of the transmission resource switching; or
  reporting, by the user device, capability information on the user device, to the network device.

19. The wireless communication method of claim 15, further comprising:
  determining, by the user device, whether a channel quality satisfies a predefined condition;
  reporting, to the network device, a downlink link quality of a current resource and a downlink link quality of a candidate resource; and
  receiving an indication, from the network device, to switch the current resource to another resource.

20. The wireless communication method of claim 15, further comprising:
  i) upon a determination that a distance between the user device and a reference location of a current resource is not a shortest distance, switching to a candidate resource that provides the shortest distance between the user device and a reference location of the candidate resource;
  ii) upon a determination that the distance between the user device and the reference location of the current resource exceeds a predetermined range, switching to the candidate resource that provides the shortest distance between the user device and the reference location of the candidate resource; or
  iii) upon a determination that a quality of the current resource is less than a sum of the threshold and a certain offset, switching to a candidate resource with a channel quality within a certain range and providing the shortest distance between the user device and the reference location of the candidate resource.

* * * * *